United States Patent Office 2,829,061
Patented Apr. 1, 1958

2,829,061
MACHINABLE CERAMIC BONDED MATERIAL AND METHOD FOR PRODUCING SAME

Jay E. Comeforo and Robert A. Hatch, Norris, Tenn., assignors to the United States of America as represented by the Solicitor of the Department of the Interior No Drawing. Application September 24, 1952
Serial No. 311,338

4 Claims. (Cl. 106—39)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (ch. 460, 45 Stat. L. 467).

This invention relates to a machinable material capable of withstanding high temperatures and resistant to wear and to thermal-shock comprising filler material bonded within a matrix of synthetic fluorine-mica, and to a method for producing such material.

Synthetic mica, suitable for the purposes of this invention may be prepared either by reaction in the solid state or by crystallization from melts as described in our application 292,594, filed June 9, 1952, now U. S. Patent No. 2,675,853, patented April 20, 1954. Suitable mica compositions that can be prepared in this manner are the synthetic fluorine-micas, as for example, the so-called "normal" fluorine phlogopite mica, of a composition corresponding to the formula $KMg_3AlSi_3O_{10}F_2$. This material may be prepared by melting materials such as $K_2SiF_6$, $MgO$, $Al_2O_3$ and $SiO_2$ or others providing the necessary components, in the proportions indicated by the formula, under conditions minimizing volatilization of the fluorides, and then crystallizing the mica from the melt by slow cooling. Fluorine-micas of this type crystallize readily from a melt of similar composition.

The synthetic fluorine-mica family is inclusive of an extensive series of compounds obtainable by substitution of other ions in the phlogopite structure on the basis of well-known crystal chemical laws. For example, the potassium ion of $KMg_3AlSi_3O_{10}F_2$ can be completely replaced with sodium, rubidium, thallium, cesium, calcium, strontium, barium, and lead. The magnesium can be replaced completely with ferrous iron, cobalt, and nickel; by about two-thirds with divalent manganese; by about one-third with lithium and divalent titanium; and about one-sixth with zinc and copper. The aluminum can be replaced with beryllium, boron, ferric iron, trivalent manganese, vanadium, silicon, and in part with chromium. The silicon can be completely replaced with germanium.

Finely ground particles of synthetic fluorine-mica can be formed by hot-pressing into a strong, dense, machinable ceramic which withstands temperatures in excess of 900° C. This material possesses a coefficient of friction of 0.3–0.5 up to 300° C. when tested at a constant speed of 1300 feet per minute and a pressure of 75 p. s. i. When tested under more severe conditions, however, the hot-pressed synthetic mica cracks due to its inherently low thermal-shock resistance. The low thermal-stock resistance of synthetic fluorine-mica is due to the low thermal conductivity of mica plus the relatively high thermal expansivity. An additional disadvantage of hot-pressed synthetic fluorine-mica when used alone as a friction material is its high wear rate (relatively easily abraded).

Accordingly, an object of this invention is to improve the thermal-shock resistance and wear resistance of synthetic fluorine-mica so that full advantage can be taken of its desirable properties of machinability and high heat resistance.

Another object of this invention is to provide a fabricated block comprising filler materials and synthetic fluorine-mica in which the mica acts as a high temperature bonding agent.

A further object of this invention is to provide a method of fabricating synthetic mica with filler materials wherein the mica is employed as the fusible bonding agent to thereby form a machinable block having high thermal-shock resistance, wear resistance, and heat resistance.

A still further object of this invention is to provide an article of manufacture comprising filler material chemically and physically bonded within a matrix of synthetic fluorine-mica.

An additional object of this invention is to provide a noncorrosive, oxidation-resistant article of metal bonded by a matrix of synthetic fluorine-mica.

An additional object of this invention is to provide an abrasive article comprising abrasive material bonded by a matrix of synthetic fluorine-mica.

These and other objects and advantages hereinafter apparent as the ensuing description proceeds, are accomplished by this invention which, in general, comprises bonding or cementing filler materials within a matrix of synthetic fluorine-mica by utilization of the mica itself as a high temperature-fusible bonding agent to form a novel product which possesses greater mechanical strength, high thermal-shock resistance, and greater resistance to abrasion than bodies made from synthetic mica alone, and which is capable of withstanding higher temperatures than any known mica-bonded material.

This method of bonding filler materials including metallic, non-metallic, or mixtures of metallic and non-metallic materials is applicable only to fluorine-containing mica and not to natural micas containing water of constitution. The natural micas decompose at the temperatures of fabrication of the materials of this invention and require extraneous low temperature fusible bonding agents to bond them with other material.

The method of bonding particles of this invention serves to protect the additives from exposure to chemical action and oxidation and yet permits the additives to impart to the product the desired properties which are lacking with the synthetic mica alone, such as greater tensile strength or greater thermal-shock resistance. The use of synthetic fluorine-mica as the bonding agent enables a product of good machinability to be formed which is substantially impossible when a hard brittle material such as glass or glass-forming materials are used in the composition as the bonding matrix. The impregnating material of this invention may be used for fabricating articles adapted to withstand temperatures greater than 900° C., at which temperature compositions bonded with low melting glasses or frits are of no value. The discovery that synthetic fluorine-mica may serve as a matrix or impregnating material presents industry for the first time with a machinable impregnant capable of withstanding temperatures as high as 1100° C.

This invention in some respects may be likened to the use of organic plastics in conjunction with glass fibers to produce a high strength material. However, in addition to a strong mechanical cementing action (identical to the action of an organic plastic with glass fibers), the synthetic fluorine-mica reacts chemically with most of the additives thereby furnishing a chemical bonding in addition to the purely mechanical type. This results in a still further increase in strength.

For example, the strength developed between the synthetic mica-metal mixtures is further increased by the development of a chemical bond between the mica and the metallic additives due to (1) a reaction between the fluorine present in the synthetic mica and the metal and (2) a partial diffusion of metallic ions such as $Fe^{++}$ and $Co^{++}$ into the mica structure.

The wide variation in the types of metal to which this invention is applicable is due in part to the wide latitude in the thermal expansion coefficient attainable with synthetic mica by appropriate alterations in the mica composition. For example, a synthetic mica of the composition $KMg_3AlSi_3O_{10}F_2$ possesses a thermal expansion coefficient of $15 \times 10^{-6}$ cm./cm./° C. from 20–800° C. whereas a synthetic mica of the composition $BaMg_{2\frac{1}{2}}AlSi_3O_{10}F_2$ exhibits a thermal expansion coefficient of $8 \times 10^{-6}$ over the same temperature range.

To clarify further the details of this invention, a few of the materials that have been successfully incorporated with a synthetic fluorine-mica are listed below. It is to be understood, however, that the invention is not to be limited to use of these specific materials as other suitable materials will readily occur to one skilled in this art.

Metal additives:
(1) Beryllium-copper alloy powder
(2) Chromel wire up to 1 inch in length
(3) 1020 steel wire
(4) Brass powder
(5) Al-Cu alloy powder
(6) Solid 18 gauge plate of 1020 type steel and 310 type stainless steel
(7) Stainless steel wire, type 304 as both short pieces of wire and also as screen, both 20 and 60 mesh The metal powders and wire found to be capable of being incorporated into the synthetic mica from a fraction of a percent of metal to over four parts of metal by weight to one part of synthetic mica. It is possible to have a still higher percentage of metal. However, with appreciably greater concentrations, the mechanical strength decreases. When approximately 40% by volume of metal is used, the metal phase becomes continuous, that is, it will conduct an electric current and will transmit heat faster than when the metal phase is not continuous. The exact percentage at which this occurs depends upon the shape, form, and density of the metal.

Non-metallic additives:
(1) Glass cloth and fiber
(2) $Mg_2SiO_4$ (forsterite)
(3) MgO (periclase)
(4) $TiO_2$ (titania)
(5) SiC (silicon carbide)
(6) WC (tungsten carbide)

Additions of non-metallic fillers and abrasives as illustrated above have been successfully used as a filler in synthetic fluorine-mica. As the amount of these materials is increased, the machinability of the product decreases and the abrasive resistance increases. Samples have been prepared with as much as 50 percent by weight of these non-metallic additives, however, this amount does not constitute a limit to the discovery described, but only serves to indicate the extensive number of fillers that can be successfully consolidated by using synthetic fluorine-mica. Its use as a binder for corundum (natural or artificial) and allied abrasive materials in abrasive wheels and other shapes is considered within the scope of this invention.

The invention is further illustrated by the following examples of practice. The use of synthetic fluorine-micas as a matrix material has been achieved in several ways. The techniques employed for each method are revealed below. For simplicity only one composition is used in the examples; however, the basic operations involved are the same regardless of the filler or fillers added. In this example consider the use of synthetic fluorine-mica having the composition $KMg_3BSi_3O_{10}F_2$ as the matrix material, and ¼ inch lengths of type 304 stainless steel wire of 18 mil diameter as the filler material, the amount of filler being 2 parts by weight and the amount of synthetic mica 1 part by weight.

*Example I*

*Hot-pressing method.*—The synthetic fluorine-mica prepared by solid state reaction and ground to a suitably sized powder such as minus 40 mesh is mixed with the wire to form a homogeneous mixture. This mixture is then transferred to a steel mold and pressed to consolidate the mass. The compact thus prepared is transferred to a graphite mold and heated while subjected to pressure, a typical set of conditions being 1050° C. under a pressure of 2000 pounds per square inch. The time the specimen is exposed to these conditions is largely dependent upon the geometry of the sample. The graphite or carbon mold introduces a reducing atmosphere which retards the oxidation of stainless steel. Under these conditions a dense, strong product is obtained which can be machined if desired. It is possible to operate at lower temperatures by applying higher pressures, using a suitable mold. Thus, temperatures several hundred degrees lower may be used at pressures of 10,000 p. s. i. to 50,00 p. s. i. and even higher.

The method of hot-pressing produces a strong, dense product and is most satisfactory in the manufacture of simple shapes.

*Example II*

*Casting in plaster molds.*—Powdered synthetic fluorine-mica is mixed with the wire and to this mixture is added a sufficient amount of liquid suspending agent such as water or alcohol to develop a viscous suspension capable of preventing the wire from separating from the mixture. The suspension thus formed is then cast into a plaster mold to form the desired shape. Vibration of the mold while casting has proven beneficial in causing the suspension properly to fill the mold, although this is not essential. After casting, the sample is dried according to standard practices and then fired. The temperature of firing is dependent upon the materials and proportions used, but a temperature in the order of 1000° C. is usually satisfactory. With fillers which are prone to oxidize, as in the case of the stainless steel wire, a reducing atmosphere is maintained during the firing operation.

The resulting product is not as dense nor as strong as that formed by Example I. It is less expensive to produce and by this method it is easier to make hollow shapes than it is by hot-pressing. For those applications in which density and strength are not critical this technique has proven to be satisfactory.

*Example III*

*Fusion casting.*—This method may in turn be divided into two categories (*a*) that in which the filler material used cannot withstand the melting temperature of the synthetic mica and (*b*) that in which the filler material can withstand the melting temperature.

The example cited in this disclosure falls into the first category and will be considered representative of this group. In this method the synthetic fluorine-mica is melted in a suitable container and then poured or cast into a mold in which the filler is either previously arranged in the locations desired or is in a form similar to the commercial product called "steel wool." The molten mica fills the interstitial spaces before crystallizing, thereby forming a relatively non-porous, strong product which is free of glass and readily machinable.

With fillers that can withstand the melting temperature of the synthetic mica the filler material is added to the molten mica, mixed by stirring or by rotating the container and then cast or poured into a mold where the mica crystallizes around the filler.

The product formed by this method possesses a greater bulk density and strength than the product formed by Example II. This method of fusion casting is readily amenable to the production of large shapes of simple geometry and probably is less expensive than Example I.

The product of this invention is the only known machinable ceramic bonded material that is capable of withstanding temperatures as high as 1000° C. Although all ceramic materials can be ground to shape, the synthetic mica ceramic product can be drilled, sawed, milled, or otherwise worked with ordinary hand or machine tools because the bonding material is soft (hardness of about 3 in Mohs' scale).

Since the fabricated block possesses high temperature stability, resists chemical and oxidizing action, has a high cofficient of friction, is machinable, and is mechanically strong at elevated temperatures as well as at low temperatures, it is applicable in many installations requiring special materials such as, a friction material for airplane brake linings, a high temperature-resisting liner or container for hot and corrosive gases, a liner in rocket motors, a component in jet engines, such as compression buckets, stator blades, and diaphragm partitions, applications in which less critical metals can be used by virtue of oxidation resistance of the new product, a semi-resistor in electrical applications, a high thermal conductivity refractory material, and a construction material for high strength at elevated temperatures.

It will be appreciated from a reading of the foregoing specification that the invention herein described is susceptible of various changes and modifications without departing from the spirit and scope thereof.

What is claimed is:

1. A ceramic composition consisting essentially of about two parts by weight of metallic filler material intermixed with and bound in place in about one part by weight of synthetic fluorine-mica of the class consisting of $KMg_3BSi_3O_{10}F_2$; $KMg_3AlSi_3O_{10}F_2$ and $BaMg_{2\frac{1}{2}}AlSi_3O_{10}F_2$ hot pressed at a temperature of not more than about 1050° C. under a pressure of about 1,000 to 50,000 pounds per square inch to cause the filler material to become bonded in place through fusion of the mica.

2. A ceramic composition according to claim 1 in which the mica is $KMg_3BSi_3O_{10}F_2$.

3. A ceramic composition according to claim 1 in which the mica is $KMg_3AlSi_3O_{10}F_2$.

4. A ceramic composition according to claim 1 in which the mica is $BaMg_{2\frac{1}{2}}AlSi_3O_{10}F_2$.

References Cited in the file of this patent

UNITED STATES PATENTS

| | | |
|---|---|---|
| 1,123,985 | Bolling | Jan. 5, 1915 |
| 1,822,636 | Winkelmann | Sept. 8, 1931 |
| 1,972,463 | Schlecht | Sept. 4, 1934 |
| 2,079,665 | Seigle | May 11, 1937 |
| 2,116,400 | Marth | May 3, 1938 |
| 2,204,581 | Denning | June 18, 1940 |
| 2,301,062 | Long | Nov. 3, 1942 |
| 2,645,060 | Waggoner | July 14, 1953 |
| 2,669,764 | Kilpatrick | Feb. 23, 1954 |
| 2,704,261 | Comeforo | Mar. 15, 1955 |

FOREIGN PATENTS

| | | |
|---|---|---|
| 601,772 | Great Britain | May 12, 1948 |